United States Patent

Kumada

[15] 3,684,351
[45] Aug. 15, 1972

[54] A FERROELECTRIC-FERROELASTIC ELECTRICALLY OPERATED OPTICAL SHUTTER DEVICE

[72] Inventor: Akio Kumada, Kodaira, Japan
[73] Assignee: Hitachi, Ltd., Tokyo, Japan
[22] Filed: Feb. 27, 1970
[21] Appl. No.: 15,134

[30] Foreign Application Priority Data

March 10, 1969 Japan..............44/18168

[52] U.S. Cl.................350/150, 350/149, 350/157, 350/160
[51] Int. Cl..............................................G02f 1/26
[58] Field of Search..350/147, 150, 157, 160, DIG. 2

[56] References Cited

UNITED STATES PATENTS

| | | | |
|---|---|---|---|
| 3,559,185 | 1/1971 | Burns et al. | 350/157 |
| 3,517,200 | 6/1970 | Kalman | 350/150 X |
| 3,391,296 | 7/1968 | Snaper | 350/157 UX |
| 3,515,887 | 6/1970 | Rosenberg et al. | 350/150 X |
| 3,555,454 | 1/1971 | Myers et al. | 350/150 X |
| 3,329,474 | 7/1967 | Harris et al. | 350/150 |

*Primary Examiner*—David Schonberg
*Assistant Examiner*—Paul R. Miller
*Attorney*—Craig, Antonelli & Hill

[57] ABSTRACT

An optical shutter or an optical pattern generator, such as a page composer in a laser holographic memory, as an application thereof, comprising a pair of polarizers, and a quarter wave plate [$2n + 1/4$ wave plate] and optical shutter crystal both disposed between said pair of polarizers. This optical shutter crystal is made of a ferroelectric-ferroelastic crystal having z-cut end faces the distance between which is arranged to be ($2n + 1/4)\lambda$, one z-plane being provided with a plurality of mutually parallel transparent electrodes, the other Z-plane being provided with a uniform transparent electrode, so as to apply an electric field at least equal to the coercive electric field of the crystal.

4 Claims, 10 Drawing Figures

INVENTOR

AKIO KUMADA

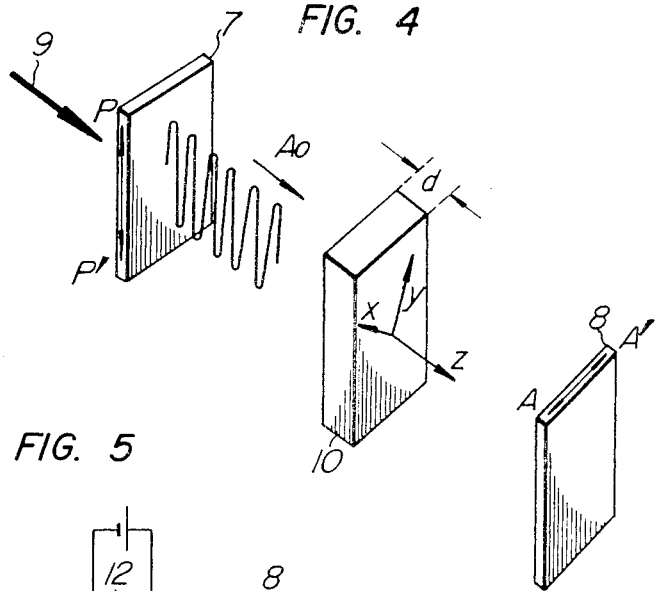
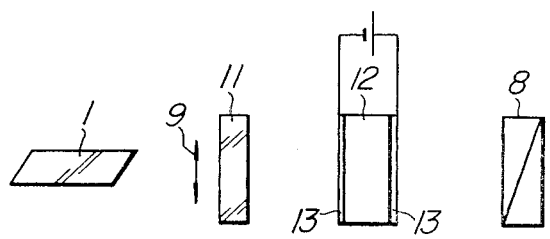
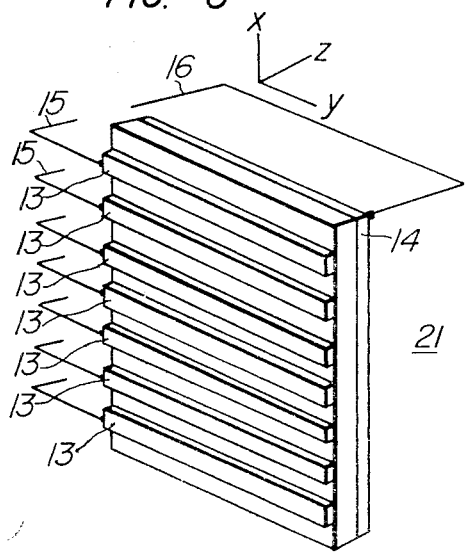
FIG. 4
FIG. 5
FIG. 6

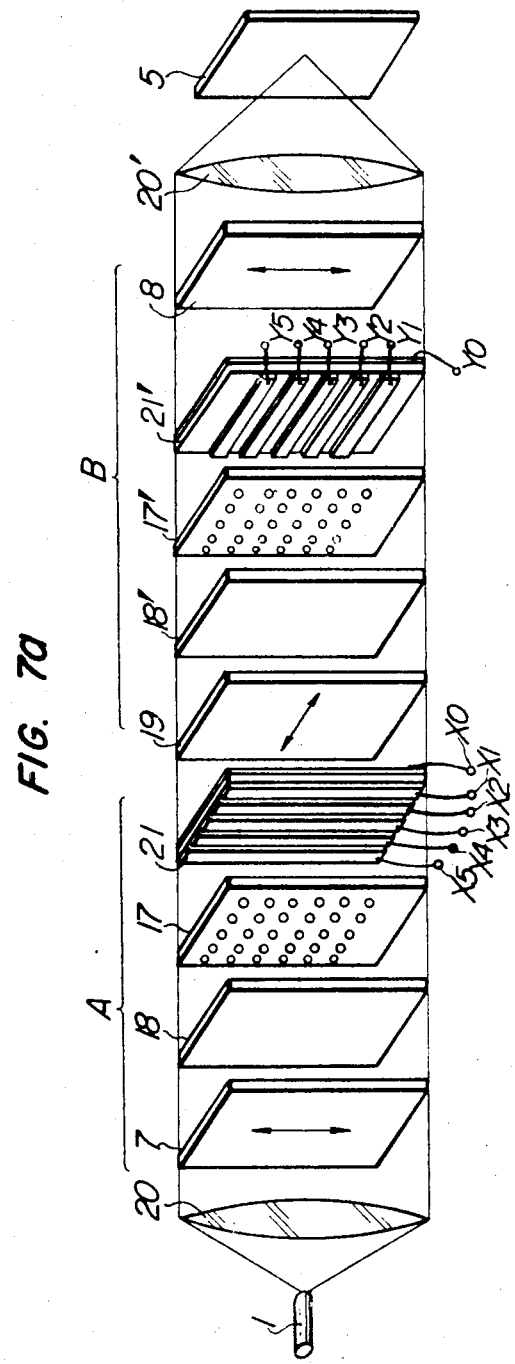

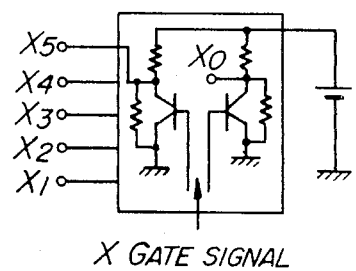
FIG. 7b
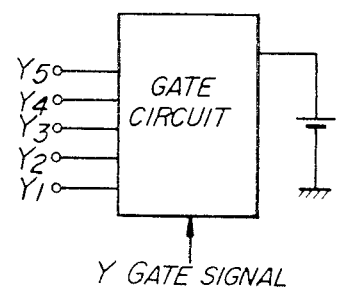
FIG. 7c
FIG. 8
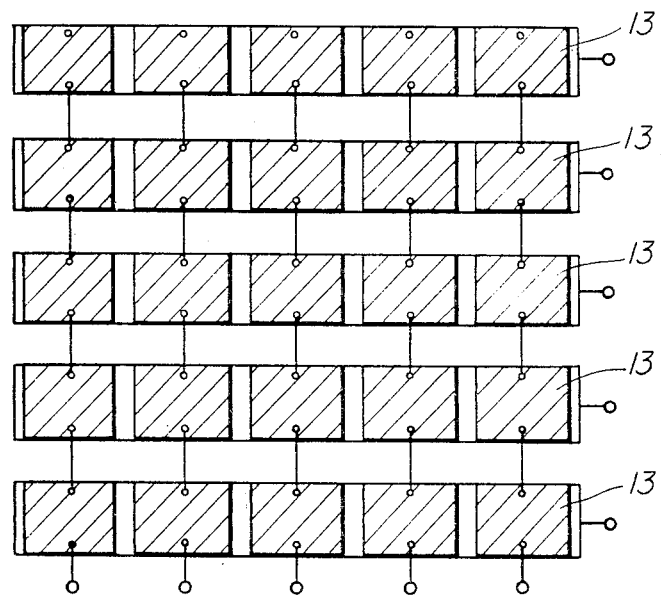

FERROELECTRIC-FERROELASTIC ELECTRICALLY OPERATED OPTICAL SHUTTER DEVICE

This invention relates to a switching element for a light beam and more particularly to a pattern generator (page composer) in a holographic memory.

To keep pace with the developments in the information industry, the capacities of electronic computing machines have rapidly increased to realize one having a memory capacity of $10^6$ bits. It is further expected that during the next decade, an ultra-large size memory of $10^8$ to $10^{10}$ bits will be available. Conventionally, every bit of desired information is stored in a respective single point in memory space. In other words, one point of a memory space can store only one bit. According to such a system, memories inevitably become large and only one bit of information can be dealt with at a time. Thus, a larger capacity has been accompanied with the consumption of much time and space.

This drawback can be minimized by the use of holography.

Now description will be made with reference to the accompanying drawings in which:

FIG. 4 illustrates the states of a linearly polarized light beam incident upon and transmitted through a Z-plate of a ferroelectric-ferroelastic crystal;

FIG. 5 illustrates the change of polarization-plane (vibration-plane) of a light beam when a linearly polarized light beam is directed toward a conjugate element comprising a quarter wave plate of a ferroelectric-ferroelastic crystal and a fixed quarter wave plate;

FIG. 6 illustrates how transparent electrodes are formed on a ferroelectric-ferroelastic crystal in the inventive optical shutter;

FIG. 7a shows the composition of a hologram memory of an embodiment of the invention;

FIGS. 7b and 7c are circuit diagrams of X- and Y-drivers for applying signals to the optical shutter of FIG. 7a, respectively; and FIG. 8 shows another embodiment of the electrode structure of the optical shutter of the invention.

Figure 1:
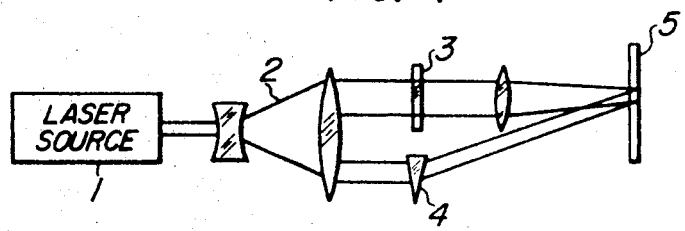
FIG. 1 is a schematic diagram illustrating the principle of a holographic pattern generating system.

A holographic memory comprises a laser beam source 1 for emitting laser beams, a collimating lens system 2 for collimating the laser beams emitted from the source 1, an object 3 of interest, a deflecting system 4 for deriving reference beams, and a storage medium 5 for storing the interference patterns of the object and the reference beams, as is shown in FIG. 1. The object 3 may be composed of a slide strip having digital data or data patterns are punched there through or printed there on and the storage medium 5 is a photographic film continuously supplied from a reel. The hologram (memory) thus formed on the storage medium 5 is a Fourier transform of the object 3, which is unique to the object and is composed of straight spectral lines in lattice formation.

Figure 2:
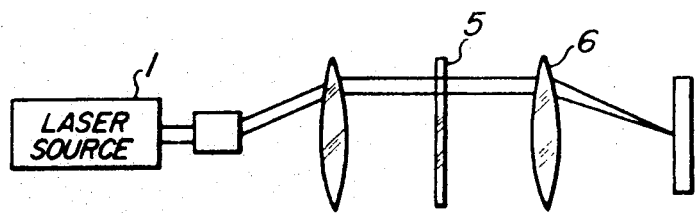
FIG. 2 is a schematic diagram illustrating the manner of reproduction of a hologram pattern obtained by the system of FIG. 1.

Reading-out of the memory can be done, as is shown in FIG. 2, by directing a laser beam from a source 1 toward an arbitrarily selected portion of the memory medium 5. The laser beam transmitted through the memory 5 is focused by a lens 6 onto a reading-out means (composed of a matrix of several thousands to several tens of thousands of photoelectric converter elements). In the object 3, digital data are selectively stored in periodically disposed spots. In order to store the data more densely in a photographic film, the data sheet is divided into smaller blocks and each block stores the information of one word. Thus, a memory stores a train of small holograms, each representing an information word. By such a method, information of $1 \times 10^8$ bits can be stored per 1 $cm^2$ at a maximum.

However, the writing of information of an optical spot pattern composing a hologram has conventionally been effected only for fixed information as by utilizing, for example punched cards. For example, when information of $10^{12}$ bits is to be written in a storage medium, the information of a two-dimensionally spread optical spot pattern of $10^4$ bits is focused by a lens system to a spot on storage medium of photosensitive material with a radius of 1 mm and stored thereat. These $10^4$ bits of information can be treated exactly at the same time and thus called a "page" which is a unit of information quantity. The upper limit of pages which can be stored in a single plane of storage medium is considered to be about $10^4$ from the standpoint of the storage medium and optical system and is called volume. Namely, one volume contains information of $10^8$ bits and information of $10^{12}$ bits is stored as $10^4$ volumes. In practice information is written in page, by page so that to write in information of $10^{12}$ bits using punched boards $10^8$ punched boards become necessary. In addition to the considerable time consumption needed for the exchange of punched boards, more time is also needed to make these punched boards, so the whole period of time becomes very large. For example, even if one board is made in one minute using a photoetching technique, a time of nearly 200 years would be necessary to prepare $10^8$ boards.

Therefore, it is desired to realize an array of more than $10^4$ shutters controllable as required for a writing-in system of holography.

This optical shutter array should satisfy the following conditions:

Individual shutters can be independently operated with respect to the effective quantity of the transmitted light beam (the intensity of the transmitted light may be controlled by phase change for polarized light as well as absorption and reflection) corresponding to the respective information bits;

2. In the case of a system in which switching of the optical shutters is electrically controlled, information can be disposed in a matrix array and selected by the voltage or current coincidence method to simplify a selector arrangement;

3. As an accompanying condition to condition (2), the characteristic properties of the optical shutters should be controlled independently of each other and have a memory action to the write-in signal; and 4. As another accompanying condition to condition (2), for the voltage coincidence method, the characteristic properties of the said optical shutters should have a threshold value for a voltage pulse of a writing-in signal. (To summarize conditions (3) and (4), the optical characteristic under control should have a hysteresis property and bi-stability with respect to the write-in signal (for example, the voltage pulse.)

Figure 3:
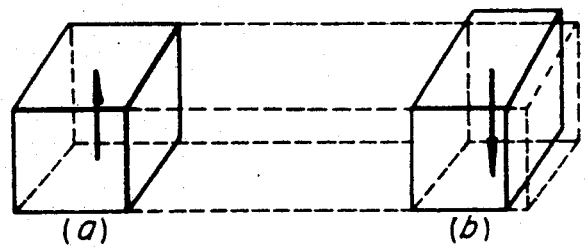
FIG. 3 illustrates the lattice deformation of a ferroelectric-ferroelastic crystal upon polarization reversal.

The present inventor has found that in certain kinds of ferroelectrics, the spontaneous polarization can be reversed and simultaneously $x$ and $y$ axes can be interchanged by the application of an electric field above a certain threshold value (which is called the coercive electric field) or a stress above a certain value (called the coercive stress). This is equivalent to a 90° rotation around the $z$ axis followed by a "mirror reflection." This phenomenon has a storing property. More particularly, the present inventor has found that in certain kinds of ferroelectric substances such as potassium dihydrogen phosphate (which will be referred to as KDP in this specification), gadolinium molybdate (which will be referred to as MOG in this specification) and boracite, the spontaneous polarization can be reversed and the $x$ and $y$ axes can be interchanged by the application of an electric field or stress over their coercive value, as is shown in FIG. 3, being different from ordinary ferroelectrics such as tri-glycine sulfate, lead zirconate titanate, or barium titanate. In FIG. 3, polarization before switching is shown on the left hand side (a) and that after switching is shown on the right hand side (b). The present inventor has found that such a phenomenon is observed in certain kinds of ferroelectrics belonging to group mm2 and thus named such ferroelectrics ferroelectric-ferroelastic substance and classified then as group imm2, which belongs to the ferroelectric-ferroelastic species $\overline{42}$ mF mm2, $\overline{43}$ mF mm2 and $\overline{6}$ m2F mm2. Such crystals, in the ferroelectric-ferroelastic phase, show birefringence and have mutually different refraction indices $\alpha$, $\beta$ and $\gamma$ for light beams vibrating along the $x$, $y$ and $z$ axes of the crystal, respectively. Taking an MOG single crystal belonging to the group imm2 as an example, refractive indices for the light rays of a wavelength $\lambda = 5893$ A vibrating parallel to the $x$, $y$ and $z$ axes are $n_x = 1.8428$, $n_y = 1.8432$ and $n_z = 1.897$, respectively. As is clear from this data, crystal belonging to the group imm2 show birefringence as biaxial crystals. The most important thing in the above mentioned explanation is that the practicable substances for the 90° rotation of their optical axial planes are only ferroelectric-ferroelastic substances belonging to the species $\overline{42}$ mF mm2, $\overline{6}$ m2F mm$\overline{2}$ and 43 mF mm2.

As is shown in FIG. 4, a Z-plate of MOG crystal 10 (being cut to have two opposing faces perpendicular to the z axis) is disposed between crossed polarizers 7 and 8 (one polarizer and one analyzer) with its optical axes being in diagonal relationship with the vibration planes of the crossed polarization. Here, the vibration planes of the polarizers 7 and 8 are perpendicular to each other and the surfaces of the polarizers 7, 8 and MOG crystal 10 are parallel to each other. When a beam of white light 9 is directed forward such an arrangement, it becomes a linearly polarized light beam at the polarizer 7, and is then changed to an elliptically, circularly or linearly polarized light beam by the retardation of the transmitted light through the crystal 10, and is finally partially transmitted through the analyzer 8. A polarizer or analyzer permits such a component of an incident beam which has the same vibration plane as that of the polarizer or analyzer to pass therethrough. Thus, an interference color is observed due to the phase difference between the light rays of various wavelengths constituting a white light beam.

When a ferroelectric-ferroelastic crystal belonging to the imm2 group is cut in a cubic shape having planes parallel to crystal axes, polished to possess optically flat surfaces, provided with electrodes on z-planes inserted between crossed polarizers in diagonal position and subjected to an incident beam of white light, an interference color appears according to the thickness of the crystal due to birefringence. This is caused by the phase difference or retardation of light rays unique to each crystal. Retardation R obeys the equation:

$$R = d \cdot \Delta n$$

where $d$ is the thickness of the crystal through which a light beam passes and $\Delta n$ represents birefringence. In ferroelectric-ferroelastic substances, $x$ and $y$ axes are interchanged upon polarization reversal as is described above. Thus, both the thickness $d$ and birefringence are subjected to a change. That is, letting the retardations corresponding to positive and negative polarization states be R(+) and R(−), R(+) and R(−) can be represented as:

$$R(+) = d_x \cdot (\gamma - \beta)$$

$$R(-) = d_y \cdot (\gamma - \alpha)$$

Since usually $$\frac{d_x \sim d_y}{d_x + d_y} = 0.01 \sim 0.001 \text{ and } \frac{\beta \sim \alpha}{\gamma} = 1 \sim 0.1$$

the interference color due to birefringence changes upon polarization reversal. Thus, an element which clearly changes the interference color in proportion to thickness can be obtained. However, in the case of an MOG single crystal, $$\frac{d_x \sim d_y}{d_x + d_y} = 1.5 \times 10^{-3} \text{ and } \frac{\beta \sim \alpha}{\gamma} = 2 \times 10^{-2}$$

and thus the color does not change very clearly, that is, the color modulation range is not wide when utilizing only retardation due to the birefringence change upon polarization reversal.

This invention eliminates the above drawback and employs a method in which the transmission direction of the incident beam coincides with the direction of the spontaneous polarization, that is the direction of the applied electric field. Therefore, the optical path d and the value of bi-refringence ($\eta\alpha \sim \eta\beta$) are both invariable upon polarization reversal. Therefore, light passing through such element shows a variety of peculiar phenomena in its transmission. Such phenomena and their principles will be described hereinafter.

When an electric field stronger than the coercive electric field is applied to the above-mentioned transparent electrodes of the Z-plate of MOG crystal, elliptically polarized light transmitted through the crystal reverses its rotational direction since the spontaneous polarization is reversed and the optical axial plane is rotated through 90°. Thus, the retardations before and after the application of an electric field have the same magnitude, but are of opposite signs.

As is shown in FIG. 5, an optical shutter is formed by arranging a coherent light source 1 which emits light rays 9 of a wavelength $\lambda_0$, a quarter wave plate 11, a quarter wave plate of MOG single crystal 12 provided with transparent electrodes 13 on Z-planes, and an analyzer 8 on the optical axis. Here, the coherent light source 1 may be a light source provided with a polarizing plate or a laser source with a Brewster window. The MOG plate 12 may be called a polarization plane rotating element. That is, when a voltage at least equal to the coercive electric field is applied to the plate 12, the double refraction of it and the retardation of the transmitted beam through the plate 12 change their signs. Thus, since retardation $R_0$ of the quarter wave plate 11 and retardation $R_G$ of the MOG plate 12 are equal in magnitude, the total retardation R becomes:

$$R = R_0 \pm R_G = 2R_0 \text{ or } 0.$$

Thus, the composite structure of the plates 11 and 12 works either as a half wave plate or a plate having no retardation. Here, two plates 11 and 12 should be disposed at a diagonal position with respect to the vibration direction of the incident linearly polarized light beam. When a linearly polarized light beam is transmitted through such a composite structure of a half wave plate, the plane of polarization is rotated by 90°, while, when a light beam is transmitted through a plate of no retardation, the vibration plane receives no variation. Polarization reversal may also be caused by the application of a stress at least equal to the coercive stress.

Capability of rotating the optical axial plane by 90° under the application of an electric field or stress is a unique property of ferroelectric-ferroelastic crystals. Therefore, the above function can be solely achieved with a combination of two quarter wave plates at least one of which is made of a ferroelectric-ferroelastic crystal of group imm2 and the other of which does not perform polarization reversal. We will call such a structure capable of rotating the vibration plane of the incident linearly polarized light beam by the application of an electric field or stress a polarization plane rotating unit.

When a polarizer is disposed to receive a light beam transmitted through a polarization plane rotating unit with the vibration direction perpendicular (or parallel) to that of the latter, an optical shutter is formed, the transmittance I of which is $$I = \sin^2 \frac{R}{O}\pi = 1 \text{ or } 0$$

Further, the thicknesses of the ferroelectric-ferroelastic plate and the quarter wave plate may not only be a quarter-wavelength but can also be $(2n + 1)/4$ wavelength.

The present inventor has proposed in U.S. Pat. No. 3,586,415 a system comprising an MOG single crystal provided with transparent row and column electrodes on the light transmitting planes in which a voltage at least equal to half of the coercive electric field can be applied to each row or column electrode to write polarization reversal in the crystal in correspondence with the external signal by a voltage coincidence method. When a linearly polarized light beam is directed toward a positively or negatively polarized part in such a crystal, the information written thereat can be read out non-destructively since the crystal transmits or shuts off the light beam according to the state of polarization.

In this system, however, transparent matrix electrodes are disposed on the light transmitting planes of a single ferroelectric-ferroelastic quarter wave plate, therefore the effect of polarization reversal occurring at the crossed over portions of the electrodes extends along the strip regions of the electrodes. Thus, it was difficult to realize such an optical switch by forming electrodes on portions of a crystal plate that effects switching function only on the light beams passing through those portions.

An object of this invention is to provide an optical shutter system capable of arbitrarily performing a switching function by accurately causing or not causing desired portions of an optical shutter element to become transparent.

A further object of this invention is to provide a pattern generator comprising the above shutter system which can continuously generate easily and accurately a predetermined information pattern in accordance with a predetermined signal.

Another object of this invention is to provide a holographic memory of large capacity.

The gist of this invention in achieving the above objects lies in disposing a $(2n + 1)/4$ wavelength plate and a Z-plate of ferroelectric-ferroelastic crystal having a distance of $(2n + 1)/4$ wavelengths between the opposing Z-planes thereof between a pair of polarizing means, with transparent electrodes deposited on the Z-planes of said ferroelectric-ferroelastic crystal plate. In this structure, it is arranged that an electric field at least equal to the coercive field of the ferroelectric-ferroelastic crystal can be applied to a necessary part of the crystal through said transparent electrodes.

Now preferred embodiments of the invention will be described hereinafter in connection with FIGS. 6 to 8.

As is shown in FIG. 6, first a quarter wave plate of a ferroelectric-ferroelastic element is prepared from a Z-plate of MOG single crystal of dimensions 12 mm × 0.387 mm (a normal to the end planes being [001], or in other words (001) plate) and having another pair of opposing planes cut parallel to the [110] plane. On one of the Z-planes, a plurality of transparent strip electrodes 13 of tin oxide, $SnO_2$, is formed by a NESA technique (evaporated electrode of $InO_2$ may also be used) in the [110] direction to have a width of 0.5 mm at intervals of 0.5 mm and connected with respective lead wires 15. On the other Z-plane, a uniform transparent electrode 14 is formed over the whole surface and connected with a lead wire 16. Thus, a ferroelectric-ferroelastic element 21 as shown in FIG. 6 is formed.

Then, as is illustrated in FIG. 7a, between a collimating lens 20 and a ferroelectric-ferroelastic plate 21, a polarizer 7, a quarter wave plate 18 and a shadow mask 17 are disposed in this order in alignment with the element 21 to form a unit A. The quarter wave plate 18 is set in a diagonal position relative to the strip electrodes on the element 21. Behind the element 21, an analyzer 19, a quarter wave plate 18', a shadow mask 17' and another ferroelectric-ferroelastic element 21' are disposed in this order with the strip electrodes of the element 21' being perpendicular to those of the element 21. Behind the element 21', an analyzer 8 is disposed in perpendicular relation to the strip electrodes of the element 21' to form a unit B and finally, a focusing lens 20' and a photographic film 5 are disposed therebehind. The elements 21 and 21' are illustrated respectively as provided with five strip electrodes in vertical and horizontal directions in FIG. 7. When a negative voltage is applied to the X-drive lead wires 15 of the element 21 to direct the polarization uniformly in the negative direction, the retardation R of the crystal plate becomes $R = -\frac{1}{4} \lambda_o$ to shut off the incident beam from an He-Ne gas laser 1 in connection with the retardation of the quarter wave plate 18. Then, if a positive voltage is applied to an arbitrary electrode to reverse the spontaneous polarization, the retardation R at the portion of the electrode becomes: $R = +\frac{1}{4}\lambda_o$ and the total retardation of the element 21 and the quarter wave plate 18 becomes $\frac{1}{2}\lambda_o$ as the result of summation to work as a half wave plate. Thus, only the light beam transmitted through this strip portion are transmitted through the analyzer 19 to be directed toward the element 21'. Since the electrodes of the element 21' are transverse to those of the element 21, portions of the five electrodes corresponding to said positively polarized portion are irradiated with light rays. The element 21' can be operated in the same manner as that of the element 21, i.e., all of the incident light rays can be shut off or only a desired portion thereof can be transmitted; therefore, information of five bits corresponding to a line in the holographic pattern can be stored in the film 5 at a time. Here, it is to be noted that the polarization under the electrodes switch independently of each other. The drive voltage was supplied from the drive circuits shown in FIGS. 7b and 7c and was 150 V for both the positive and negative singals. Switching time was 1 msec and the voltage pulse width was 2 msec. Even after the pulse voltage disappears, the direction of spontaneous polarization that is the state of generated optical pattern can be kept in memorized state. Thus, a holographic pattern is written through the lens 20' in the film 5 to be a spot of 1 mm$\phi$ and stored thereat. In this embodiment, since the sensitivity of the photographic film was low, the exposure time was selected to be 100 msec and the element 21 was arranged to be switched from line to line at every 100 msec. Another element 21' was also switched at every 100 msec to generate the pattern of the next line. Repeating these procedures five times, information of 5 × 5 = 25 bits were focused onto one spot and written-in. Similar steps were repeated for other spots of the photographic film. Thus, information of about $10^4$ bits could be stored in an area of 2 cm × 2 cm on a photographic film. The density of information could thus be effectively increased.

Description has been made of a pattern generator for use in a file memory utilizing laser hologram hereinbefore. But this invention could be equally used as a topological optical shutter for shutting off unnecessary light rays and for other purposes, for example such as a random access matrix shutter working as a composer of a random access slide in a teaching machine. In such cases in which the number of shutters are small as is the case in the above example, one unit for example unit B in FIG. 7a may be dispensed with. For example, as is shown in FIG. 8, a ferroelectric-ferroelastic crystal corresponding to one now in FIG. 8 is provided with five strips transparent electrodes having dimensions 6 mm × 8 mm into which a transparent sheet 6 mm × 50 mm in size with an interval of 2 to 2.5 mm between each pair of adjacent electrodes to form an unelectroded area, on one side. On the other side, a uniform electrode is formed on the whole surface. Then, lead wires are connected to the respective electrodes. Then five crystals of such a structure are disposed side by side as is shown in FIG. 8 and on said one side five lead wires connected to the same column are connected in series and led out to form one column. Thus, five columns on the front face and five rows on the back face form a matrix, and a random access matrix shutter is formed in which any one address can be arbitrarily selected by a voltage coincidence method. Although more than one address of the matrix cannot arbitrarily be operated in this system, multi-exposure is possible if the operation is carried out sequentially in time. Thus, this system also has very wide applications.

As is described above, this invention provides the following advantages:

a. Even a monolithic body of a ferroelectric-ferroelastic substance such as an MOG single crystal can be used for a pattern generator, in which polarization reversal due to the application of a coercive electric field can be located only in the limited cross over portion of the electrodes on both surfaces so as to enable an accurate writing-in;

b. Thus, a pattern generator of a high signal to noise ratio can be obtained, for example when used with a coherent beam and a suitable mask, since unnecessary light does not enter any undesirable portions.

What is claimed is:

1. An optical shutter device comprising:
a pair of polarizing means;
a Z-plate of ferroelectric-ferroelastic crystal having the crystallographic symmetry of mm2, disposed between said pair of polarizing means and having the thickness of $$\frac{2n+1}{4} \lambda$$

for a predetermined wavelength $\lambda$ of the incident beam;
a plurality of mutually parallel transparent electrodes formed on one of the z-planes of said Z-plate, a uniform transparent electrode formed on the whole surface of the other z-plane, and electric means for supplying an electric field at least equal to the coercive electric field of the crystal through said electrodes;
a $$\frac{2n+1}{4} \lambda$$

plate for said wavelength, where $n$ is an arbitrary positive integer or 0; and
shadow mask disposed between said $$\frac{2n+1}{4} \lambda$$

plate and said ferroelectric-ferroelastic crystal and having circular openings arranged to be in registration with said plurality of transparent electrodes.

2. An optical shutter according to claim 1, in which said ferroelectric-ferroelastic crystal is made of gadolinium molybdate.

3. An optical shutter device according to claim 1 further comprising:
   an additional polarizing means;
   an additional Z-plate of ferroelectric-ferroelastic crystal having the crystallographic symmetry of mm2, disposed between said additional polarizing means and one of said pair of polarizing means and having the thickness $$\frac{2n+1}{4}\lambda$$

for said predetermined wavelength of said incident beam;
   an additional plurality of mutually parallel transparent electrodes formed on one of the Z-planes of said additional Z-plate, a uniform transparent electrode formed on the whole surface of the other Z-plane of said additional Z-plate, and electric means for supplying an electric field at least equal to the coercive electric field of said additional crystal through said additional electrodes;
   an additional $$\frac{2n+1}{4}\lambda$$

plate for said wavelength;
   and an additional shadow mask disposed between said additional $$\frac{2n+1}{4}\lambda$$

plate and said additional ferroelectric-ferroelastic crystal and having circular openings arranged to be in registration with said additional plurality of said transparent electrodes;
   wherein said first mentioned plurality of electrodes and said additional plurality of electrodes are in the form of respective sets of strip electrodes mutually orthogonal to one another.

4. A pattern generator according to claim 3 in which said ferroelectric-ferroelastic crystal is made of gadolinium molybdate.

* * * * *